US012784245B2

(12) United States Patent
Jackson et al.

(10) Patent No.: US 12,784,245 B2
(45) Date of Patent: Nov. 3, 2026

(54) IMAGE PROCESSING AND SEGMENTATION OF SETS OF Z-STACKED IMAGES OF THREE-DIMENSIONAL BIOLOGICAL SAMPLES

(71) Applicant: Sartorius Bioanalytical Instruments, Inc., Bohemia, NY (US)

(72) Inventors: Timothy Jackson, Bohemia, NY (US); Nevine Holtz, Bohemia, NY (US)

(73) Assignee: Sartorius BioAnalytical Instruments, Inc., Bohemia, NY (US)

( * ) Notice: Subject to any disclaimer, the term of this patent is extended or adjusted under 35 U.S.C. 154(b) by 380 days.

(21) Appl. No.: 18/211,948

(22) Filed: Jun. 20, 2023

(65) Prior Publication Data

US 2023/0334683 A1 Oct. 19, 2023

Related U.S. Application Data

(62) Division of application No. 16/854,710, filed on Apr. 21, 2020, now Pat. No. 11,727,586.

(51) Int. Cl.

*G06T 5/73* (2024.01)
*G06T 5/50* (2006.01)

(Continued)

(52) U.S. Cl.

CPC ................ *G06T 7/529* (2017.01); *G06T 7/11* (2017.01); *G06T 2207/10056* (2013.01);

(Continued)

(58) Field of Classification Search

CPC . G06T 7/529; G06T 7/11; G06T 2207/10056; G06T 2207/10064;

(Continued)

(56) References Cited

U.S. PATENT DOCUMENTS 5,878,152 A 3/1999 Sussman
10,025,988 B2 * 7/2018 Yuan .................... G06T 7/0002

(Continued)

FOREIGN PATENT DOCUMENTS

CN 107133956 A 9/2017
EP 1355273 A2 * 10/2003 ............ G06V 10/10

(Continued)

OTHER PUBLICATIONS

Fang, Depth-Based Target Segmentation for Intelligent Vehicles: Fusion of Radar and Binocular Stereo, IEEE Transactions on Intelligent Transportation Systems, vol. 3, No. 3, Sep. 2002 (Year: 2002).*

(Continued)

*Primary Examiner* — Vu Le
*Assistant Examiner* — Lei Zhao
(74) *Attorney, Agent, or Firm* — McDonnell Boehnen Hulbert & Berghoff LLP

(57) ABSTRACT

Methods are provided to project depth-spanning stacks of limited depth-of-field images of a sample into a single image of the sample that can provide in-focus image information about three-dimensional contents of the image. These methods include applying filters to the stacks of images in order to identify pixels within each image that have been captured in focus. These in-focus pixels are then combined to provide the single image of the sample. Filtering of such image stacks can also allow for the determination of depth maps or other geometric information about contents of the sample. Such depth information can also be used to inform segmentation of images of the sample, e.g., by further dividing identified regions that correspond to the contents of the sample at multiple different depths.

20 Claims, 8 Drawing Sheets

(51) Int. Cl.

| | |
|---|---|
| ***G06T 7/11*** | (2017.01) |
| ***G06T 7/174*** | (2017.01) |
| ***G06T 7/529*** | (2017.01) |
| ***G06T 7/571*** | (2017.01) |

(52) U.S. Cl.
CPC ............... *G06T 2207/10064* (2013.01); *G06T 2207/20021* (2013.01); *G06T 2207/30024* (2013.01); *G06T 2207/30096* (2013.01)

(58) Field of Classification Search
CPC . G06T 2207/20021; G06T 2207/30024; G06T 2207/30096; G06T 5/73; G06T 2207/20221; G06T 2207/30072; G06T 5/50; G06T 7/174; G06T 7/571
See application file for complete search history.

(56) References Cited

U.S. PATENT DOCUMENTS

| | | | |
|---|---|---|---|
| 2008/0137938 | A1 | 6/2008 | Zahniser |
| 2014/0111532 | A1 | 4/2014 | Manchi |
| 2015/0286044 | A1 | 10/2015 | Rout |
| 2018/0278826 | A1 | 9/2018 | Abe |
| 2019/0113423 | A1 | 4/2019 | Goodman |

FOREIGN PATENT DOCUMENTS

| | | | | | |
|---|---|---|---|---|---|
| JP | 2013509022 | A | * | 3/2013 | ............. H04N 19/46 |
| JP | 2017174416 | A | | 9/2017 | |
| WO | 2014049978 | A1 | | 4/2014 | |
| WO | WO-2014083574 | A2 | * | 6/2014 | ............... G06T 5/50 |
| WO | 2018050862 | A1 | | 3/2018 | |

OTHER PUBLICATIONS

Dekkers, High-resolution 3D imaging of fixed and cleared organoids, Nature Protocols, vol. 14, Jun. 2019, 1756-1771 (Year: 2019).*
BioTek, "Cytation 5 Cell Imaging Multi-Mode reader", 13 pp's., https://www.biotek.com/products/imaging-microscopy-cell-imaging-multi-mode-readers/cytation-5-cell-imaging-multi-mode-reader, Retrieved on Apr. 22, 2020*.
Aguet et al, "Joint Texture and Topography Estimation for Extended Depth of Field in Brightfield Microscopy", 2006 IEEE, pp. 778-781*.
Borten et al., "Automated brightfield morphometry of 3D organoid populations by OrganoSeg", Scientific Reports, published Mar. 28, 2018, 10 pages*.
Valdecasas et al., "On the extended depth of focus algorithms for bright field microscopy", Micron 32 (2001) 559-569*.
Kasprowicz et al., "Characterising live cell behaviour: Traditional label-free and quantitative phase imaging approaches", The International Journal of Biochemistry & Cell Biology 84 (2017) 89-95*.
Cameron et al., "Intrinsic Resistance of V-SVZ Neural Stem Cells Subjected to Concurrent Daily Radiation and Temozolomide Therapy", International Journal of Radiation Oncology, Biology, Physics, vol. 102, No. 3S, Supplement 2018*.
Kassis et al., "OrgaQuant: Intestinal Organoid Localization and Quantification Using Deep Convolutional Neural Networks", 12 pages*.
Rios et al., "Imaging organoids: a bright future ahead", Nature Methods, vol. 15, No. 1, Jan. 2018
International Searching Authority, International Search Report and Written Opinion dated May 28, 2021, issued in connection with International Patent Application No. PCT/US2021/015308*.
Said Pertuz et al., "Alanysis of focus measure operators for shape-from-focus", Pattern Recognition, vol. 46, No. 5, May 1, 2013, pp. 1415-1432*.
Dekkers et al., "High-resolution 3D imaging of fixed and cleared organoids", Nature Protocols, Nature Publishing Group, GB, vol. 14, No. 6, May 3, 2019, pp. 1756-1771*.

* cited by examiner

IMAGE PROCESSING AND SEGMENTATION OF SETS OF Z-STACKED IMAGES OF THREE-DIMENSIONAL BIOLOGICAL SAMPLES

CROSS-REFERENCE TO RELATED APPLICATIONS

The present application is a divisional of U.S. patent application Ser. No. 16/854,710 filed Apr. 21, 2020, the contents of which are incorporated by reference herein in its entirety.

BACKGROUND

A variety of biological experiments include the analysis of a great many samples, each of which may be associated with a number of parameters or other information generated via measurement or assessment of the sample. Such samples may include cells or other biological contents, each sample differing with respect to growth medium (e.g., hormones, cytokines, pharmaceuticals, or other substances in the growth medium), source (e.g., cultured, biopsied or otherwise explanted from natural tissue), incubation conditions (e.g., temperature, pH, light level or spectrum, ionizing radiation), or some other controlled conditions in order to observe the response of the cells or other biological contents to the applied conditions. This could be done, e.g., in order to assess the response of the samples to a putative therapy, to elucidate some biological process, or to investigate some other question of interest.

Assessing such samples may include using a microscope, fluorescence imager, or other means to microscopically image the samples. In practice, the imaging of samples across a large depth of field may be impeded by limitations of the optics or other apparatus used to image the samples. For example, an objective or other elements used to image the sample may be limited with respect to depth of focus, making it difficult or impossible to simultaneously image, in focus, the entirety of a sample that spans a volume that is larger, along the optical axis of a device used to image the sample, than the depth of focus of the imaging apparatus. Such “three-dimensional” samples, as contrasted with samples that are spread across a glass slide and/or that have been sectioned into slices such that they span a volume that can fit within the depth of field of an imaging apparatus, may contain a variety of structures of interest, e.g., organoids, tumor spheroids, or other three-dimensional multicellular structures.

SUMMARY

An aspect of the present disclosure relates to a method for generating a projection image of a three-dimensional sample, the method including: (i) obtaining a set of images of the sample, wherein each image of the set of images corresponds to a respective focal plane within the sample; (ii) applying a filter to each image of the set of images to determine a respective depth value for each pixel of an output image of the sample, wherein a given depth value represents a depth, within the sample, at which the contents of the sample can be imaged in-focus; and (iii) determining an image value for each pixel of the output image based on the depth value of the pixel of the output image. Determining an image value for a particular pixel of the output image includes: (1) identifying an image of the set of images that corresponds to the depth value of the particular pixel; and (2) determining the image value for the particular pixel based on a pixel, of the identified image, having a location within the identified image that corresponds to the particular pixel.

Another aspect of the present disclosure relates to a method for generating a projection image of a three-dimensional sample, the method including: (i) obtaining a set of images of the sample, wherein each image of the set of images corresponds to a respective focal plane within the sample; (ii) applying a filter to each image of the set of images to determine a respective depth value for each pixel of a depth map, wherein the depth value represents a depth, within the sample, at which contents of the sample can be imaged in-focus; and (iii) determining an image value for each pixel of an output image based on the depth value of a corresponding pixel of the depth map.

Yet another aspect of the present disclosure relates to a method for segmenting an image of a sample, the method including: (i) obtaining an image of the sample; (ii) obtaining a depth map of contents of the sample; (iii) generating a first segmentation map of the sample based on the image; and (iv) based on the depth map, generating a second segmentation map of the sample by further dividing at least one region of the first segmentation map.

Yet another aspect of the present disclosure relates to a computer-readable medium that is configured to store at least computer-readable instructions that, when executed by one or more processors of a computing device, cause the computing device to perform computer operations carrying out one or more of the methods described herein. Such a computer-readable medium could be a non-transitory computer-readable medium.

Yet another aspect of the present disclosure relates to a system including: (i) one or more processors; and (ii) a non-transitory computer-readable medium that is configured to store at least computer-readable instructions that, when executed by the one or more processors, cause the system to perform one or more of the methods described herein.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
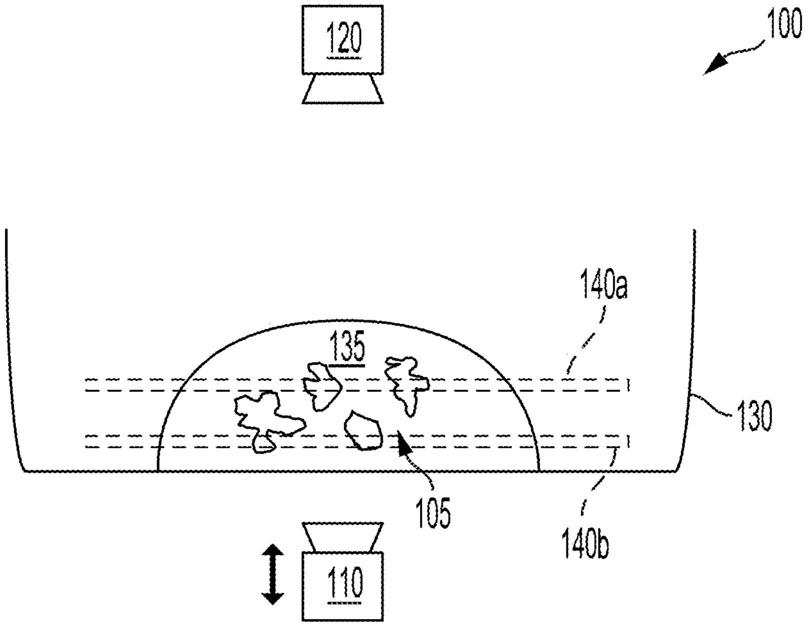
FIG. 1 is a cross-sectional schematic view of a sample being imaged by an imaging system.

Examples of methods and systems are described herein. It should be understood that the words "exemplary," "example," and "illustrative," are used herein to mean "serving as an example, instance, or illustration." Any embodiment or feature described herein as "exemplary," "example," or "illustrative," is not necessarily to be construed as preferred or advantageous over other embodiments or features. Further, the exemplary embodiments described herein are not meant to be limiting. It will be readily understood that certain aspects of the disclosed systems and methods can be arranged and combined in a wide variety of different configurations.

I. EXAMPLE SAMPLE IMAGING

It can be beneficial in a variety of applications to microscopically image a sample. For example, the sample could include cultured human cells (e.g., cancer cells, normal cells) and imaging the sample could facilitate determining the effectiveness of a drug at eliminating cells in the sample (e.g., the effectiveness of chemotherapy drugs at eliminating cancer cells), determining the toxicity of a substance (e.g., the toxicity of a chemotherapy drug to non-cancerous cells), or determining some other information about the contents of the sample and/or about the effect of a substance on the contents of the sample. Imaging the sample can include using bright field microscopy, fluorescence microscopy, structured illumination, confocal microscopy, or some other imaging techniques to generate image data about the contents of the sample.

Bright field microscopy has the benefit of being able to be performed without adding dyes, fluorophores or other labels (e.g., by addition of the labels and/or by transfection of sample contents to express the labels) that can alter the 'natural' behavior of sample contents (such imaging, without added labels, may be referred to as "label-free" imaging). Alternatively, fluorescent dyes or other labels can be added to facilitate imaging of particular tissue structures and/or physiological processes. For example, an Annexin V green fluorescent dye-based reagent could be added to image the location, rate, or other information about cell death in a sample. In another example, a NucLight Red indicator could be added to image information about cell proliferation in a sample. In some examples, the cells in a sample could be genetically modified to express fluorescent proteins or other labels related to processes of interest. For example, patient-derived neural induced pluripotent stem cells (iPSCs) could be genetically modified to express $A\beta_{1-42}$-GFP or some other fluorescently-tagged protein associated with Alzheimer's disease to facilitate the assessment of putative Alzheimer's treatments.

Many objectives or other optical elements of an imaging apparatus used to image samples may be limited with respect to depth of field. That is, the optical apparatus may be limited to imaging, in focus, light that is received from a relatively small-volume and/or substantially planar volume of a sample. Light received from outside of this volume may be received (by a charge-coupled device or other light-sensitive element of the imaging apparatus) out of focus. This limitation may be related to the cost or overall quality of the imaging apparatus, a desire to reduce chromatic, axial, spherical, or other aberration in the imaging apparatus, a desire to reduce the volume, size, weight, or number of parts of the imaging apparatus, a desire to improve the performance of the apparatus in some way by restricting its use to imaging small-volume and/or substantially planar volumes, or due to some other factor(s). Such a limitation in the depth of field of an imaging apparatus may be compensated for in a variety of ways.

In some examples, the samples to be imaged may be intrinsically small-volume and/or substantially planar or may be modified to be so. However, many samples of interest contain individual objects that may span a volume that does not fit within the narrow depth-of-field of an imaging device and/or may contain useful information about the distribution, interconnection, or other spatial information of multiple objects across a distance within the sample, in a direction perpendicular to an imaging plane of the imaging device that exceeds the narrow depth-of-field of the imaging device. Such 'three-dimensional' samples may include organoids, tumor spheroids, or some other three-dimensional, multi-cellular structures of interest. Further, such structures may be cultured or otherwise disposed within a medium (e.g., a dome or otherwise-shaped volume of extracellular medium) that spans a volume that does not fit within the narrow depth-of-field of an imaging device. For example, the sample could be part of a multi-spheroid assay wherein tumor spheroids (or some other variety of spheroids) are arranged in a layered and embedded format within a volume of matrigel.

Organoids (e.g., pancreatic-cell organoids, hepatic-cell organoids, intestinal-cell organoids) and tumor spheroids are of particular interest, as their three-dimensional structure more closely mimics the 'natural' three-dimensional environment of the cells being cultured. Accordingly, the reaction of organoids, tumor spheroids, or other such three-dimensional multi-cellular structures to drugs or other applied experimental conditions is likely to more closely mimic the response to corresponding samples in the human body or other some other environment of interest. Organoids may be cultured from a patient's own cells, in order to predict the particular patient's response to a range of different possible treatments. For example, iPSCs could be extracted from the patient and used to culture a neuron organoid, a breast cancer organoid, or organoids approximating some other healthy or non-healthy (e.g., cancerous) tissue of interest to facilitate assessment of the response of such tissues to possible treatments.

In order to use a limited depth-of-field imaging apparatus to image the contents of such samples, a variety of techniques may be used. In some examples, some or all of the sample could be spread onto a microscope slide or other flat member to facilitate imaging of the sample. However sample-spreading or other sample preprocessing methods to make a sample compatible with a limited depth-of-field imaging apparatus may not be applicable to a sample of interest, may result in destruction of the sample, loss or distortion of information about the sample (e.g., distortion of the sample due to interaction with a microtome, freezing, fixation, being removed from a sample container, being spread, etc.), or other unwanted effects, or may be inapplicable to the sample of interest. Further, such sample preprocessing methods preclude the possibility of imaging the same sample (e.g., the same sample of cultured organoids or tumor spheroids) at multiple points in time, e.g., to analyze the long-term effects of a drug or other experimental condition over time.

Additionally or alternatively, an imaging apparatus with a more shallow depth of field could be replaced with an imaging apparatus having a deeper depth of field; however, such an improved imaging apparatus could be too costly, could be too large to fit inside an incubator or other environment of interest, or could be undesirable with respect to some other consideration.

The above limitations of a limited-depth-of-field imaging apparatus may be fully or partially alleviated by employing the methods described herein. Applying these methods to the operation of such a limited depth-of-field imaging apparatus allows for the generation of image information that could alternatively be obtained from an imaging apparatus having a depth-of-field equal to or exceeding the volume spanned by the sample in a direction parallel to the optical axis of the imaging apparatus. The image processing methods described herein includes generating a plurality of images of a 'three-dimensional' sample (which may be referred to as a 'stack' of images, each image corresponding to a respective different depth within the sample). Each image could be taken with a respective different depth within the sample being in focus by using a motor or other actuator to control the location of the imaging apparatus relative to the sample. This could include moving the camera, moving the sample container, or moving both of the sample container and the camera.

FIG. 1 illustrates an example system 100 that could be used to generate such a set of images. The system 100 includes an imaging apparatus 110 (e.g., a camera, objective, and/or other optical or electrical elements) and a light source 120 that can be used to image a sample contained in a sample container 130. The sample container 130 could be a well of a multi-well incubation or culture plate (e.g., a 96-well culture plate). The sample container 130 contains a number of objects 105 (e.g., organoids, tumor spheroids, or other three-dimensional biological objects) contained within a sample medium 135 (e.g., a dome of extracellular medium used to culture the organoids prior to transferring the organoids to wells of a 96-well multi-well culture plate or some other multi-well culture plate prior to application of a variety of differing putative treatments or other experimental conditions, or a multi-spheroid assay that includes a layered and embedded arrangement of tumor spheroids within a volume of matrigel).

The arrangement of the elements (e.g., camera 110 and light source 120) in FIG. 1 is intended as a non-limiting example. A light source used to illuminate a sample could be located opposite the sample from a camera or other imaging apparatus, on the same side of the sample as the imaging apparatus, to the side of the sample relative to the imaging apparatus, or at some other location relative to the sample and imaging apparatus. Further, a light source could be incorporated into an imaging apparatus and/or could share one or more optical elements or optical paths with an imaging apparatus (e.g., an objective of a confocal imaging system could be shared between a laser or other element used to illuminate the sample and a charge-coupled device or other element used to image light received from the sample). In some examples, multiple light sources could be provided in multiple locations, e.g., to facilitate operating to image the sample according to different modes (e.g., fluorescent imaging, brightfield imaging, reflective/scattering visible light imaging, structured illumination imaging, phase contrast imaging).

The camera 110 and/or light source 120 could be configured such that the camera 110 is capable of imaging light received from a small, substantially flat volume within the sample container 130. Such a configuration could be chosen instead of a large depth-of-field configuration in order to reduce cost, increase reliability, reduce size or mass, or to provide some other benefit(s). For example, such a configuration could be chosen to reduce to size and/or weight of the camera in order to facilitate mounting the camera 110, light source 120, and/or other elements of an imaging apparatus on an actuated gantry within an incubator so as to allow for long-term automated imaging of multiple samples within an incubator at multiple different points in time. Region 140*a* represents, in cross-section, the extent of a first example volume that could be imaged in-focus by such a limited depth-of-field imaging apparatus. Region 140*b* represents, in cross-section, another example of such a region, differing from the first region 140*a* with respect to depth within the sample container 130 but spanning substantially the same area in directions perpendicular to an optical axis of the camera 110.

The location of the camera 110 relative to the sample container 130 could be set, at different points in time, to facilitate imaging a respective different volumes, or depths, within the sample container 130. This could include using an actuated gantry or other means to move the camera 110 relative to the sample container 130 (e.g., by moving the camera 110 and/or moving the sample container 130) in order to select a flat region within the sample container 130 to image in focus. For example, during a first period of time (e.g., a period of time illustrated in FIG. 1), the camera 110 could operate to image the first volume 140*a* in focus. The camera 110 could then be moved downward relative to the sample container 130 and subsequently operated to image the second volume 140*b* in focus. Such a procedure could be repeated for a plurality of different volumes, and corresponding depths, within the sample container 130 in order to generate a set or 'stack' of images that represents the contents of the sample container 130. Such a procedure can facilitate the generation of in-focus image information for objects 105 (e.g., organoids, tumor spheroids, or other three-dimensional biological objects) that have a characteristic dimension greater than the depth of field of the camera 110 and/or that are located at points ranging along the vertical dimension within the sample container 130 at distances greater than the depth of field of the camera 110.

Such a process to generate sets of images that are 'stacked' could be performed in an automated manner. For example, a camera and associated actuator could operate to generate such a set of images of a sample at a number of specified number of points in time (e.g., once every hour, once every 24 hours, etc. to facilitate analysis of the response of the sample contents to an applied experimental condition over time). Additionally or alternatively, the sample could be located within a multi-well sample container, and a set of images could be generated for each of the samples in the container by actuating the camera in two dimensions to select a particular sample (e.g., by operating actuators of a gantry that contains the camera) and in a third dimension to image different depths within the particular sample.

Figure 2A:
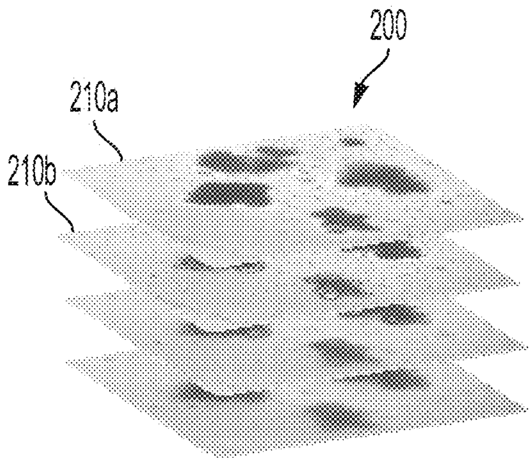
FIG. 2A depicts a set of example images of a sample.

FIG. 2A shows an example set (or 'stack') of images 200 of a sample. Each image of the set of images 200 corresponds to a respective focal plane within the sample.

Accordingly, each image may represent, in focus, respective different contents of the sample depending on the location of the contents relative to the focal plane corresponding to the image. In a first example, a top image 210*a* of the set of images 200 corresponds to a first focal plane at which none of the sample contents are located. Accordingly, the image information of the top image 210*a* is all out-of-focus. In another example, a second image 210*b* of the set of images 200 corresponds to a second, different focal plane at which some of the sample contents are located. Accordingly, some of the image information of the second image 210*a* (i.e., the three-dimensional object to the left and bottom of the second image) is in focus, while other portions of the image information of the second image 210*b* are out-of-focus.

Figure 2B:
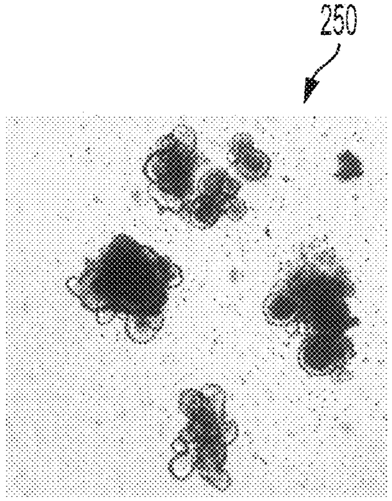
FIG. 2B depicts a projection image generated based on the set of example images of FIG. 2A.

Such a set of images 200 can contain sufficient in-focus image information to generate a projection image of the sample that provides an improved view of the distribution of the contents within the sample. For example, some or all of the contents of the sample may be represented in-focus in the projection image. The projection image could approximate an image of the sample as if it had been generated using a wider depth of field FIG. 2B shows an example of such a projection image 250 that has been generated from a set of images including the set of images 200 shows in FIG. 2A. Such a projection image could facilitate improved imaging and analysis of the contents of a sample. For example, a projection image could be segmented in order to identify discrete cells, organoids, tumor spheroids, or other three-dimensional contents of the projection image. Such an image segmentation could then be used to automatically determine a number, size, identity, morphology, or other information about cells, organoids, tumor spheroids, or some other analysis of the contents of the sample. Additionally or alternatively, such a projection image could facilitate subjective analysis of the contents of the sample by a pathologist, a researcher, an epidemiologist, or some other person.

A projection image could be generated for a sample, from a set of images corresponding to respective different focal planes within the sample, in a variety of ways. In some examples, this could include using the set of images to determine the depth at which contents of the sample are located and/or come into focus. Pixels or other image information from the image, or the set of images, that corresponds to the determined depth could then be used (or 'projected') to generate corresponding pixels of the projection image. Such depth information could additionally or alternatively be used to generate a depth map for contents of the sample (e.g., to facilitate analysis of the three-dimensional geometry and/or arrangement of the contents of the sample) and/or to improve segmentation of the projection image (or of some other image of the sample).

II. EXAMPLE GENERATION OF DEPTH MAPS

Sets of narrow depth-of-field images (e.g., bright field images) of a sample, corresponding to respective different depths spanning a range of depths within the sample, may contain sufficient information to determine information about the depth of contents of the sample. Such sets of 'stacked' images may also contain sufficient image information that can be combined with the depth information to generate a projection image of the sample that represents the contents of the sample in-focus across a range of depths (e.g., as a sort of simulated wide depth-of-field image of the sample). The methods described herein facilitate generating such depth information (e.g., as depth maps) and such projection images from sets of narrow field-of-view images (e.g., brightfield images, fluorescence images).

These methods include detecting edges, textures, or other high-spatial-frequency contents within each image of the set of images. The presence of such high-spatial-frequency contents at a particular location within a particular image may indicate that that the contents of the sample at the particular location were imaged in-focus. Accordingly, it can be assumed that the contents of the sample at the particular location are located at the depth, within the sample, that corresponds to the depth of the particular image. Thus, a depth map or other depth information may be generated for a sample by identifying 'in-focus' regions within each image of a set of images of the sample. These identified regions can then be combined across the set of images to generate a single depth map and/or projection image of the sample.

Identifying 'in-focus' regions within each image of a set of images of the sample can include applying a filter or transformation to each of the images. For example, a Canny edge detector or other edge detection filter or algorithm could be applied to generate, for each image in the set of images, a respective 'edge image' that represents where edges are located in each of the images. In another example, a texture filter could be applied to each image in the set of images to generate respective 'texture images' that represents where, in each image, regions of increased high-spatial-frequency information (or 'texture') are located.

"Texture" can be determined in a variety of ways. For example, a texture value for a particular pixel of an image can be determined by determining an entropy, a numerical range, a standard deviation, a variance, a coefficient or variation, or some other measure of the variability of a set of pixels in the neighborhood of the particular pixel. Such a neighborhood could be a square or otherwise shaped region of neighboring pixels, e.g., a five-by-five square of pixels centered on the particular pixel for which the texture value is being determined. The pixels in the 'neighbor' region could be equally weighted, or could be used in a weighted manner to determine a texture value (e.g., by giving higher weighting to pixels closer to the particular pixel for which the texture value is being determined than to farther away pixels when determining, e.g., an entropy, a standard deviation, etc.). Such texture values could be determined for every pixel in an image, for a subset of the pixels (e.g., for every other pixel) in the image, or for some other set of locations within the image.

As noted above, regions of a particular narrow depth-of-field image that have higher texture values (or higher values of some other property that is related to high-spatial-frequency contents of an image) are more likely to have been imaged in-focus. Thus, contents of a sample that correspond to a particular high-texture location of a particular image of the sample are likely to be located at a depth within the sample corresponding to the depth of the focal plane of the particular image. The texture information for a particular location within the set of images (e.g., corresponding to a location of a particular pixel index within each of the images) can be compared across all of the images in order to determine a single depth value for the particular location. Such a determination could be used to generate a full depth map for the sample and/or to generate pixels of a projected output image of the sample (e.g., by selecting pixel(s) of the image, of the set of images, that corresponds to the determined depth for use in generating pixels of the projection image).

Figure 3A:
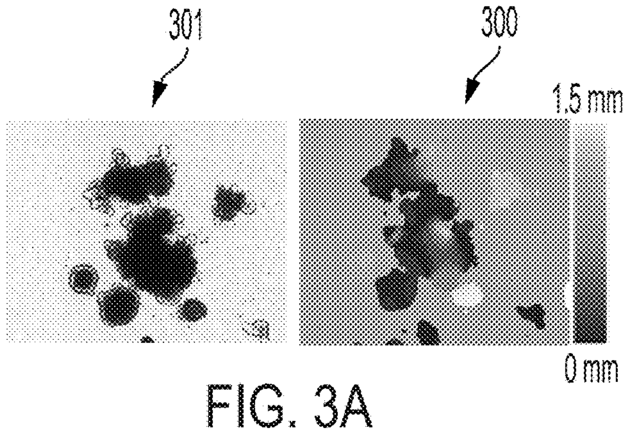
FIG. 3A depicts an example projection image and an example depth map of a sample.

To illustrate this process, FIG. 3A shows an image 301 (e.g., a projection image generated as described herein) of a sample. The image 301 is shown next to a depth map 300 of the sample. Each object in the image 301 may include one or more organoids, tumor spheroids, or other three-dimensional multi-cellular objects. The depth map 300 shows that some of the apparently singular objects depicted in the image 301 possibly depict multiple overlapping objects at differing depths within the sample.

Figure 3B:
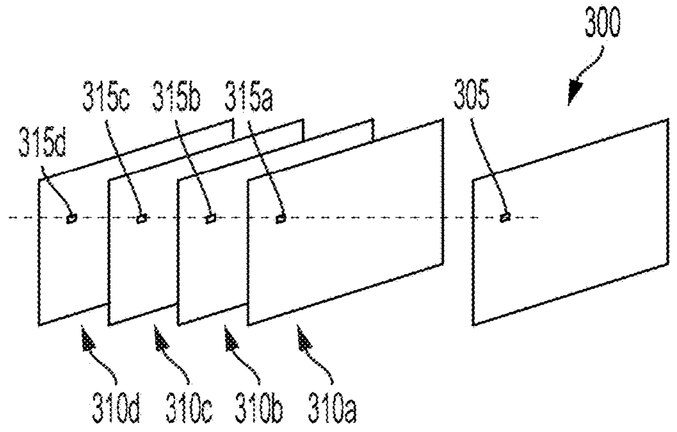
FIG. 3B depicts set of example images of the sample used to generate the depth map of FIG. 3A.

FIG. 3B illustrates the depth map 300 of the sample and a set of narrow depth-of-field images 310*a*, 310*b*, 310*c*, 310*d* of the sample that correspond to respective different focal planes at respective different depths within the sample. The depth map 300 and images of the set of images have the same resolution and pixels locations for ease of explanation. It will be appreciated by one of skill in the art that the methods herein may be adapted to circumstances where the depth map, projection image, and/or input images of the set of images have differing resolutions and/or pixel locations.

A depth value for a particular pixel 305 of the depth map 300 may be determined based on the texture values (or other values representing the local magnitude of high-spatial-frequency image content) of corresponding pixels 315*a*, 315*b*, 315*c*, 315*d* in each image of the set of images 310*a*, 310*b*, 310*c*, 310*d*. As shown in FIG. 3B, the images of the set of images and the depth map may have the same size and resolution, in which case the pixel correspondences may be one-to-one. This is intended as a non-limiting example of determining a depth value for a particular pixel of a depth map based on texture information from each of the input images at locations, within the input images, that correspond to the location of the particular pixel within the depth map.

The depth value may be selected, based on the set of texture (or other high-spatial-frequency image content) values, in a variety of ways. For example, the highest texture value (or lowest, if lower texture values correspond to greater amounts of high-spatial-frequency image content) could be determined and the depth determined according to the depth of the input image corresponding to the highest texture value. This could be done based on the assumption that the highest texture value is likely to correspond, for a particular pixel location, to the image that is most in-focus at that particular location and thus that the contents of the sample are likely to be located at the corresponding depth within the sample.

Figure 3C:
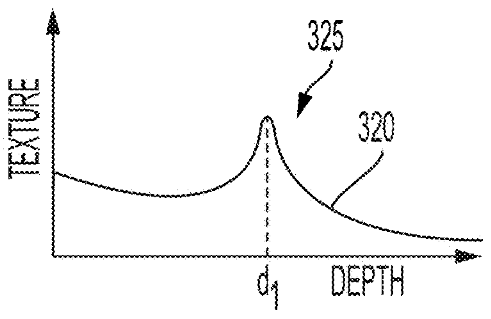
FIG. 3C is an example set of texture values determined across a range of depths for a sample.

Additional or alternative methods could be applied to determine a depth value based on the set of texture values. For example, the depth may be determined based on the depth of a peak or other feature detected within the set of texture values. FIG. 3C illustrates a plot of a set of texture values 320 determined for a particular pixel of an output depth map as a function of the depth of the input images used to generate the texture values. A peak 325 is present in the texture data; this peak could be detected and the depth ('di' in FIG. 3C) determined therefrom. Peak detection could be employed to determine the depth value based on the assumption that peaks within the texture values as a function of depth are likely to correspond, for a particular pixel location, to the contents of the sample being in-focus at that particular location and thus that the contents of the sample are likely to be located at the corresponding depth within the sample.

Depth values determined as described above may be used as-is as pixels of a depth map, to generate pixels of a projection image, to improve the segmentation of one or more images of a sample, or to facilitate some other application. Alternatively, some level of spatial pre-processing may be applied to the determined depth values prior to such applications (e.g., spatial pre-processing could be applied to a set of depth values determined as described above in order to generate a depth map). For example, a two-dimensional low-pass or other type of linear filter could be applied to the depth values prior to applying them in an application. Additionally or alternatively, a non-linear pre-processing method could be applied. For example, an edge-preserving low-pass spatial filter could be applied. As another example, depth values that are outliers relative to their neighbors (e.g., that exceed the mean value for their neighbors by more than a specified amount, e.g., a multiple of the standard deviation of their neighbors) could be removed, set to a particular amount (e.g., a mean, median, or other central measure of their neighbors), filtered using more aggressive filter parameters, or pre-processed in some other manner to reduce the effect of such outliers on subsequent processing.

III. EXAMPLE IMAGE FORMATION

Depth information for a sample (e.g., a depth map, individual depth values) may be used to project pixels or other image information from a set of images of the sample into a single projection image of the sample (e.g., as in example projection images 250 and 301). The depth information can be used to determine which image(s) of the set of images to draw from when setting the intensity, color, or other image information for each pixel of the projection image. As noted above, where the set of input images varies with respect to focal plane within the sample, depth information can be used to select which of the images to project from when generating pixels of the projection image such that the projection image appears completely in focus or otherwise improved relative to the set of input images.

Figure 4:
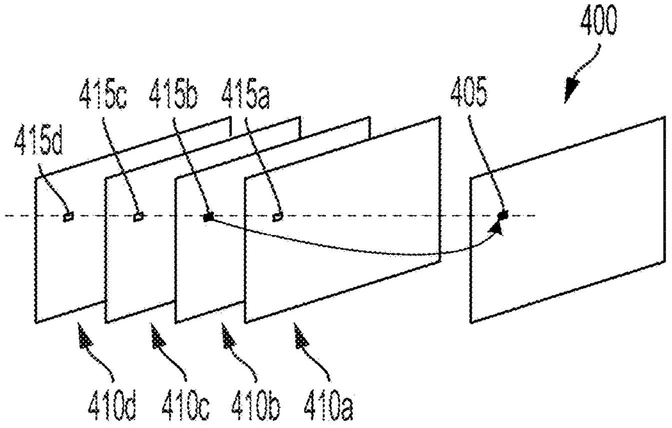
FIG. 4 depicts set of example images of a sample used to generate a projection image of the sample.

FIG. 4 illustrates a projection image 400 of a sample and a set of narrow depth-of-field images 410*a*, 410*b*, 410*c*, 410*d* of the sample that correspond to respective different focal planes at respective different depths within the sample. The projection image 400 and images of the set of images have the same resolution and pixels locations for ease of explanation. It will be appreciated by one of skill in the art that the methods herein may be adapted to circumstances where the depth map, projection image, and/or input images of the set of images have differing resolutions and/or pixel locations.

An image value (e.g., one or more of a luminance, a chrominance, a red, a green, and/or a blue channel color value) for a particular pixel 405 of the projection image 400 may be determined based on a depth value determined for the particular pixel 405. Such a depth value may be obtained from a depth map of the sample, or may be determined on a pixel-by-pixel basis. The depth value may be determined as described above (e.g., by identifying the depth of an image, of a set of images, that has the highest texture value at a location corresponding to each pixel of the projection image), or using some other method, e.g., using a phase contrast image, a depth sensor, of some other depth detecting means.

Determining the image value for the particular pixel 405 may include copying the image value of a corresponding pixel of an image that matches the depth value for the particular pixel 405. For example, in FIG. 4 the second image 410*b* has a depth corresponding to the depth value determined for the particular pixel 405. Accordingly, the image value (e.g., luminance, intensity, etc.) of the corresponding pixel 415*b* of the second image 410*b* is copied, or projected, to be the image value for the particular pixel 405.

This one-to-one projection of image values is intended as a non-limiting example of determining an image value for a particular pixel of a projection image based on a depth value and one or more narrow depth-of-field images corresponding to that depth value. Additional pixels could be used (e.g., combined in a weighted combination) to generate the image value for the particular pixel 405. In some examples, the image value of the particular pixel 405 and/or of neighboring pixels could be determined, in whole or in part, based on a number of pixels neighboring the corresponding pixel 415*b* of the second image 410*b*. Additionally or alternatively, image information from multiple images that correspond to depth values within a specified range of the depth value of the particular pixel 405 may be used to generate the image value of the particular pixel 405. For example, the image value of the particular pixel 405 could be determined based on a combination of the corresponding pixel 415*b* of the second image 410*b* and corresponding pixels 415*a*, 415*c* of the first 410*a* and third 410*c* images, the first 410*a* and third 410*c* images corresponding to depths within a neighborhood (e.g., a specified range) of the depth value of the particular pixel 405.

IV. EXAMPLE IMAGE SEGMENTATION

It can be beneficial in a variety of contexts to identify, in an automated manner, the extent, location, size, identity, and/or other information about organoids, tumor spheroids, cells, particles, or other three-dimensional, multi-cellular discrete contents within an image of a biological sample or other environment of interest. Such a process may be referred to as "image segmentation." Image segmentation can be used to automatically perform a variety of analyses on the content of an image, e.g., to determine a number, type, volume/size, spatial distribution, shape, growth rate, or other properties of cells, organoids, or tumor spheroids in a sample.

A variety of methods are available in the art to perform segmentation on microscopic images of biological samples. Such methods can include one or more of thresholding, clustering, edge detection, region-growing, an artificial neural network or other machine-learning algorithm, or some other technique or combination of techniques to identify putatively different contiguous regions within an image. Each region identified using such methods could correspond to a respective organoid, cancer spheroid, cell, or component or portion thereof. Such methods could be applied to one or more narrow depth-of-field images of a sample. The segmentation could be improved by segmenting a projection image of a sample, determined as described above, since such a projection image represents more of the contents of the sample in-focus than any individual narrow depth-of-field image used to generate the projection image.

Figure 5A:
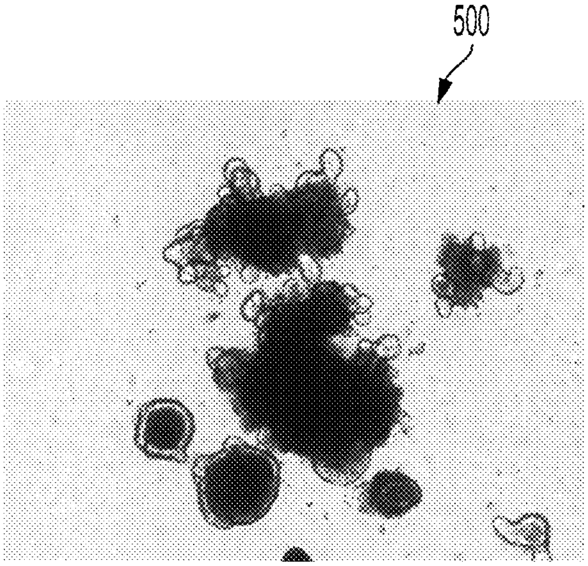
FIG. 5A is an example image of a sample.
Figure 5B:
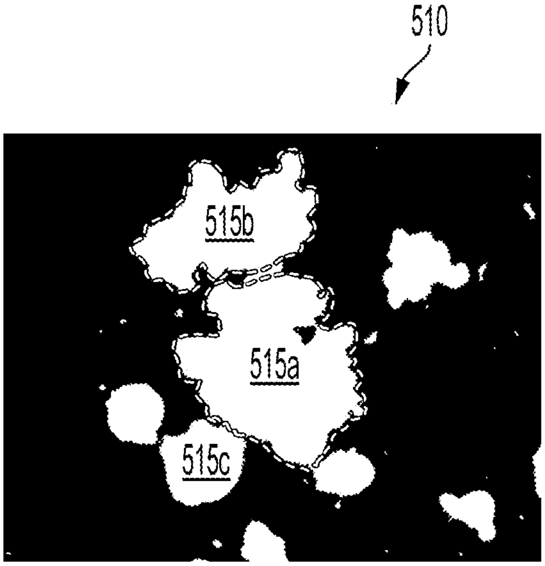
FIG. 5B is an example first segmentation map of the sample represented by the image of FIG. 5A.

FIG. 5A shows an example image 500 of a sample. The image could be a projection image generated as described elsewhere herein or could be obtained in some other manner. As illustrated in FIG. 5B, the image 500 can be segmented to generate a first segmentation map 510 of the sample. The regions include first 515*a*, second 515*b*, and third 515*c* example regions. Each region could represent a respective different object, multiple objects, and/or portions of objects (e.g., organoids, tumor spheroids, cells) within the sample.

Figure 5C:
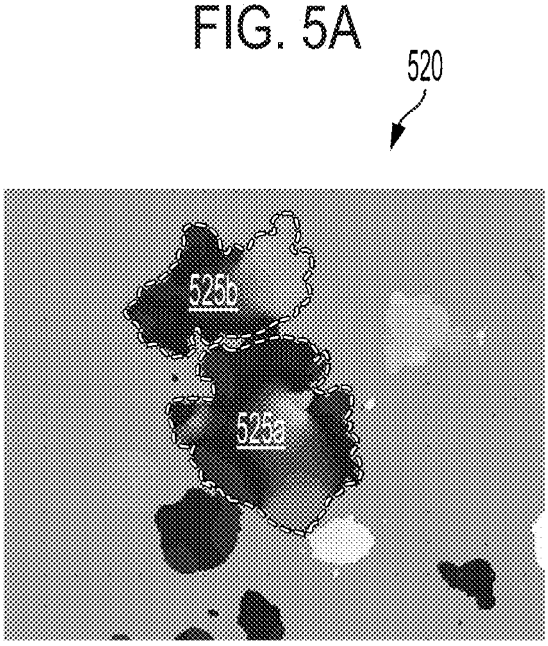
FIG. 5C illustrates particular segments of the first segmentation map of FIG. 5B, overlaid onto an example depth map.

The accuracy of the identified regions can be limited by the image information that is available in the input image 500. For example, the boundaries, within the input image, between separate overlapping or adjacent objects may be fuzzy or otherwise sub-optimal in a manner that prevents the segmentation method from identifying the separate objects as respective different regions in the segmentation map. FIG. 5C shows a depth map 520 of the sample that is represented by the input image 500. The depth map 520 may be generated based on a set of narrow depth-of-field images using the methods described herein (e.g., based on texture information present in the set of images) or may be generated via some other method (e.g., using a depth sensor). The depth map 520 shows that at least the first 515*a* and second 515*b* regions of the first segmentation map 510 likely represent multiple distinguishable objects, based on the difference in depth between different contiguous regions within the areas 525*a*, 525*b* of the depth map 520 that correspond to the first 515*a* and second 515*b* regions, respectively.

Accordingly, depth information provided by a depth map 520 or from some other source may be applied to improve the segmentation of an image. This can include using the depth information from the depth map to further divide one or more regions of the first segmentation image to generate an improved second segmentation image. For example, the depth information corresponding to a particular region of the first segmentation map 510 could be analyzed to determine whether it represents more than one potentially discrete population of depth values. If it does, the particular region could be further divided according to the locations of the depth values within each of the discrete populations.

Figure 5D:
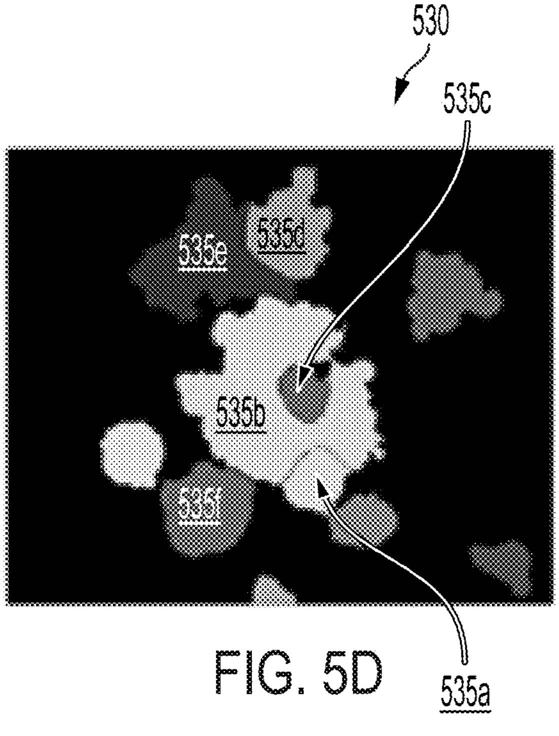
FIG. 5D is an example second segmentation map determined from the first segmentation map of FIG. 5B.

As an example, FIGS. 5C and 5D illustrate an analysis of the first 515*a* and second 515*b* regions of the first segmentation map 510 to determine whether to further divide those regions when generating an improved second segmentation map 530. For the first region 515*a*, depth values (e.g., pixels of the depth map 520) that correspond to the location and extent of the first region 515*a* (indicated in FIG. 5C as a first patch 525*a* of depth values) can be analyzed to identify regions into which the first region 515*a* can be further divided.

This could include performing clustering, region growing, or other analyses on the population of depth values within the first patch 525*a* to identify two or more regions within the first patch 525*a*. The first region 515*a* can then be further divided, into regions 535*a*, 535*b*, and 535*c*, of the second segmentation map 530. This division can include generating the additional divisions based on the locations of the depth map pixels of the depth map 520 that correspond to each of the identified clusters. Such a process could include performing filtering, region-growing, edge-preservation, or other processes to ensure that the determined divisions result in contiguous and/or reasonably smooth regions 535*a*, 535*b*, and 535*c* following the division of the parent region 515*a*. A similar process could be applied to divide the second region 515*b* of the first segmentation map 510 into corresponding regions 535*d*, 535*e* of the second segmentation map 530. Note that such analysis can also result in no division being performed, as the third region 515*c* of the first segmentation map 510 has been maintained as a single region 535*f* in the second segmentation map 530.

V. EXAMPLE APPLICATIONS

The systems and methods described herein can be used to facilitate a variety of biological applications in sample imaging. This can include imaging, at a plurality of points in time across hours, days, weeks, or some other duration, or a plurality of samples (e.g., 96 samples contained within respective wells of a 96-well sample plate) that are located within an incubator using an automated imaging system to avoid having to perturb the samples by removing them from the incubator. The imaged samples could contain 3D cultures of human cells or tumor cells, organoids, tumor spheroids, or other cells. The cells could be natural, or could be the result of some experimental process (e.g., the result of exposure to a carcinogen in order to create cancer cells). Further, the cells could be labeled with a fluorescent dye or genetically modified to express a fluorescent protein, other reporter substance, or to provide some other biological insight (e.g., to assess the effects of the genetic modification on the cells).

The samples could be prepared and imaged in order to perform drug discovery and/or assess the toxicology of a drug or other substance in the fields of immunology, oncology, neuroscience, cell therapy, or other fields of research. In examples where the samples include and/or are permitted to develop organoids, imaging the samples can facilitate investigation of organ development, the development and/or quantification of disease models, and/or the development of regenerative medicine.

The described systems and methods support a variety of imaging modalities. For example, label-free, bright-field images could be taken of organoids, multi-spheroids embedded in extracellular medium, or other three-dimensional samples that may be, for example, disposed in wells of a 96-well assay. Fluorescence imaging could be employed to image fluorescent reporters that may act to label cells and/or may be reporters of cell function or some other property of interest as part of a fluorescent assay. For example, an Annexin V green fluorescent dye-based reagent could be imaged to assess the location, rate, or other information about cell death in a sample, a NucLight Red indicator could be imaged to assess information about cell proliferation in a sample, or some other fluorescent reporter or system of reporters (e.g., a multi-color FUCCI assay) could be fluorescently imaged to assess information about cell division, function, identity, or differentiation. This could be done in order to, e.g., perform a cell health assay of samples containing organoids, multi-spheroids, or some other three-dimensional objects of interest.

Where multiple different samples in a multi-well plate (e.g., a 96-well plate) are imaged, the samples could vary from well to well with respect to cell contents (e.g., cell types, tumor cell types), the amount or identity of an added substance (e.g., a dose of an added drug, a particular variety of an added drug variant as part of a drug discovery assay), a type of genetic modification, or some other varying experimental condition. The automated imaging and image processing techniques described herein could then be applied to assess the efficacy and/or toxicity of applied substances/treatments, or to determine some other experimental data of interest.

VI. EXAMPLE SYSTEMS

A variety of systems may be employed (e.g., programmed) to perform the various embodiments described herein. Such systems can include desktop computers, laptop computers, tablets, or other single-user workstations. Additionally or alternatively, the embodiments described herein may be performed by a server, cloud computing environment, or other multi-user system.

Such systems could analyze data received from other systems, e.g., data received from a remote data storage on a server, from a remote cell counter or other instrument, or from some other source. Additionally or alternatively, a system configured to perform the embodiments described herein may include and/or be coupled to an automated incubator, sample imaging system, or some other instrument capable of generating experimental data for analysis. For example, such an instrument could include an incubator that contains a multi-well sample container. The samples within such a multi-well sample container could differ with respect to the genome of the samples, the source of the samples, the growth medium applied to the samples, a pharmaceutical or biologic applied to the samples, or some other condition applied to the samples.

Samples within such an apparatus could be experimentally assessed in a variety of ways. The samples could be imaged (e.g., using visible, infrared, and/or ultraviolet light). Such imaging could include fluorescent imaging of the contents of the samples, e.g., imaging fluorescent dyes or reporters added to the samples and/or generated by the cells of the samples (e.g., following insertion of genes coding for fluorophores). An automated gantry could be located within such an incubator to facilitate imaging of the various samples within respective wells of the sample container or to facilitate the measurement and analysis of the various samples within respective wells of the sample container.

As an example, an automated imaging system may be employed to obtain, in an automated fashion, images (e.g., brightfield images, fluorescence images) of a plurality of biological samples, in respective wells of a sample container, during a plurality of different scan periods over time. A set of images could be taken, by the automated imaging system, of each sample during each of the scan periods, e.g., a set of images differing with respect to focal plane within the sample. The images can then be analyzed in order to determine a depth map, a projection image, or some information about the samples, e.g., according to the methods described herein.

Use of such an automated imaging system can significantly reduce the personnel costs of imaging biological samples, as well as increasing the consistency, with respect to timing, positioning, and image parameters, of the images generated when compared to manual imaging. Further, such an automated imaging system can be configured to operate within an incubator, removing the need to remove the samples from an incubator for imaging. Accordingly, the growth environment for the samples can be maintained more consistently. Additionally, where the automated imaging system acts to move a microscope or other imaging apparatus relative to the sample containers (instead of, e.g., moving the sample container to be imaged by a static imaging apparatus), movement-related perturbation of the samples can be reduced. This can improve the growth and development of the samples and reduce movement-related confounds.

Such an automated imaging system can operate to obtain one or more images during scans that are separated by more than twenty-four hours, by more than three days, by more than thirty days, or by some longer period of time. The scans could be specified to occur at a specified rate, e.g., once per daily, more than daily, more than twice daily, or more than three times daily. The scans could be specified such that at least two, at least three, or some greater number of scans occurs within a twenty-four hour period. In some examples, data from one or more scans could be analyzed (e.g., according to the methods described herein) and used to determine the timing of additional scans (e.g., to increase a rate, duration, image capture rate, or some other property of the scans in order to detect the occurrence of a discrete event that is predicted to occur within a sample).

The use of such an automated imaging system can facilitate imaging of the same biological sample at multiple points in time over long time periods. Accordingly, the development and/or behavior of individual cells and/or networks of cells (e.g., organoids, tumor spheroids) can be analyzed over time. For example, a set of cells, portions of cells, or other objects could be identified, within a single sample, within scans taken during different, widely spaced periods of time. These sets of identified objects could then be compared between scans in order to identify the same object(s) across the scans. Thus, the behavior of individual organoids, tumor spheroids, cells, or portions of cells, can be tracked and analyzed across hours, days, weeks, or months.

Figure 6:
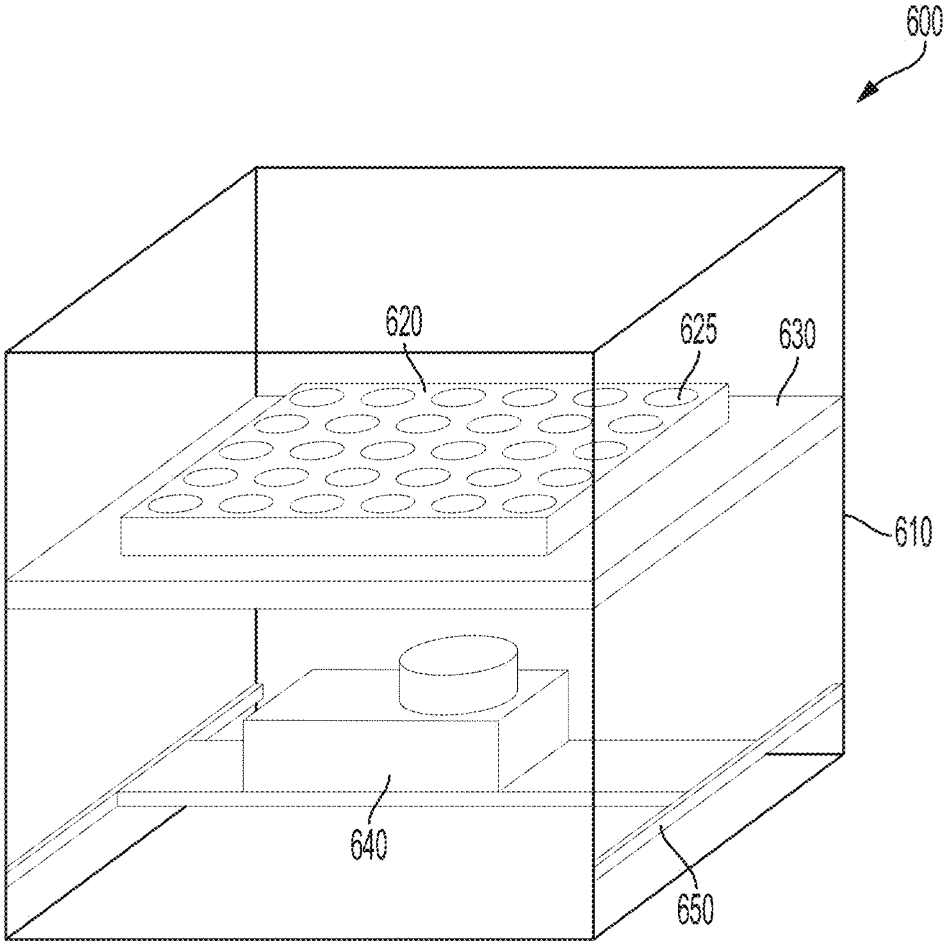
FIG. 6 illustrates in perspective view elements of an example system.

FIG. 6 illustrates elements of such an automated imaging system 600. The automated imaging system 600 includes a frame 610 to which other elements of the automated imaging system 600 are attached. The frame 610 may be configured (e.g., sized) in order to fit within an incubator. The automated imaging system 600 includes a sample container 620 that is removably placed within a sample container tray 630 that is coupled to the frame 610. The sample container tray 630 could be removable and/or could include a removable insert to facilitate holding a variety of different sample containers (e.g., a variety of industry-standard sample containers). The system 600 additionally includes an actuated gantry 650 configured to position an imaging apparatus 640 relative to the sample container 620 such that the imaging apparatus 640 can operate to obtain images of the contents of individual wells of the sample container 620 (e.g., the example well 625).

The imaging apparatus 640 can include a microscope, a fluorescence imager, a two-photon imaging system, a phase-contrast imaging system, one or more illumination sources, one or more optical filters, and/or other elements configured to facilitate imaging samples contained within the sample container 620. In some examples, the imaging apparatus 640 includes elements disposed on both sides of the sample container 620 (e.g., a source of coherent, polarized, monochromatic, or otherwise-specified illumination light in order to facilitate, e.g., phase contrast imaging of biological samples). In such examples, elements on both sides of the sample container 620 may be coupled to respective different gantries, to the same gantry, and/or elements on one side of the sample container 620 may not be movable relative to the sample container 620.

The actuated gantry 650 is coupled to the frame 610 and the imaging apparatus 640 and configured to control the location of the apparatus 640 in at least two directions, relative to the sample container 620, in order to facilitate imaging of a plurality of different samples within the sample container 620. The actuated gantry 650 may also be configured to control the location of the imaging apparatus 640 in a third direction, toward and away from the sample container 620, in order to facilitate controlling the focal distance of images obtained using the imaging apparatus 640 and/or to control a depth of material, within the sample container 620, that can be imaged using the imaging apparatus 640. Additionally or alternatively, the imaging apparatus 640 may include one or more actuators to control a focal distance of the imaging apparatus 640. The imaging apparatus 640 could include one or more motors, piezo elements, liquid lenses, or other actuators to facilitate controlling the focus setting of the imaging apparatus 640. For example, the imaging apparatus 640 could include an actuator configured to control a distance between the imaging apparatus 640 and a sample being imaged. This could be done in order to ensure that the image is taken in-focus and/or to allow images to be taken such that a variety of different focal planes within the sample are represented in respective different images.

The actuated gantry 650 may include elements configured to facilitate detection of the absolute and/or relative location of the imaging apparatus 640 relative to the sample container 620 (e.g., to particular well(s) of the sample container 620). For example, the actuated gantry 650 may include encoders, limit switches, and/or other location-sensing elements. Additionally or alternatively, the imaging apparatus 640 or other elements of the system may be configured to detect fiducial marks or other features of the sample container 620 and/or of the sample container tray 630 in order to determine the absolute and/or relative location of the imaging apparatus 640 relative to the sample container 620.

Computational functions (e.g., functions to operate the actuated gantry 650 and/or imaging apparatus 640 to image samples within the sample container 620 during specified periods of time and/or to perform some other method described herein) may be performed by one or more computing systems. Such a computing system may be integrated into a laboratory instrument system (e.g., 600), may be associated with such a system (e.g., by being connected via a direct wired or wireless connection, via a local network, and/or via a secured connection over the internet), and/or may take some other form (e.g., a cloud computing system that is in communication with an automated imaging system and/or that has access to a store of images of biological samples).

Figure 7:
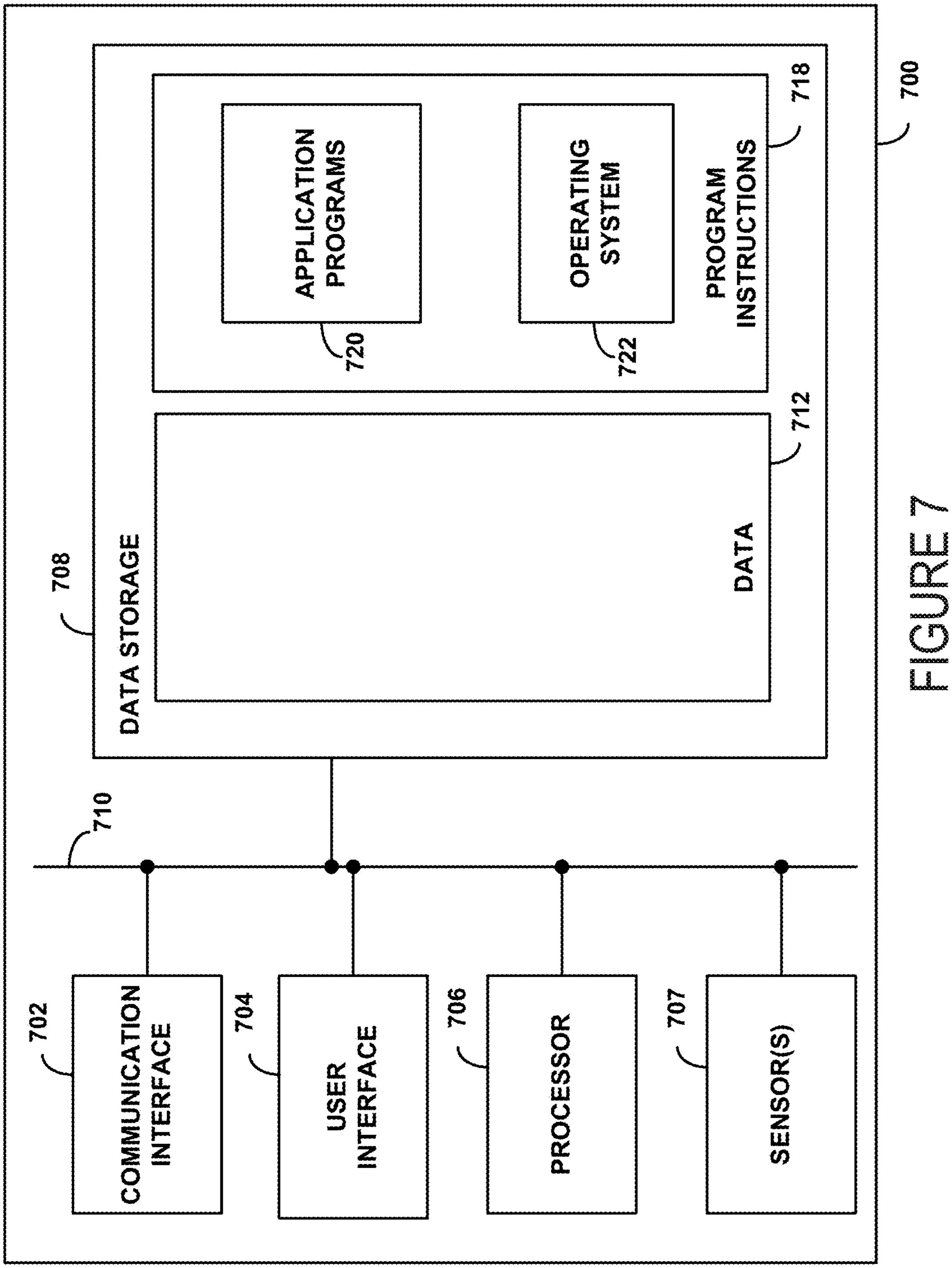
FIG. 7 is a schematic illustration of elements of an example system.

FIG. 7 illustrates an example of such a computing system 700, which may be used to implement the methods described herein. The example computing system 700 includes a communication interface 702, a user interface 704, a processor 706, one or more sensors 707 (e.g., photodetectors, cameras, depth sensors, a microscope, or some other instrumented laboratory apparatus), and data storage 708, all of which are communicatively linked together by a system bus 710.

The communication interface 702 may function to allow the computing system 700 to communicate, using analog or digital modulation of electric, magnetic, electromagnetic, optical, or other signals, with other devices, access networks, and/or transport networks. Thus, communication interface may facilitate circuit-switched and/or packet-switched communication, such as plain old telephone service (POTS) communication and/or Internet protocol (IP) or other packetized communication. For instance, communication interface 702 may include a chipset and antenna arranged for wireless communication with a radio access network or an access point. Also, communication interface 702 may take the form of or include a wireline interface, such as an Ethernet, Universal Serial Bus (USB), or High-Definition Multimedia Interface (HDMI) port. Communication interface may also take the form of or include a wireless interface, such as a WiFi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 702. Furthermore, communication interface 702 may comprise multiple physical communication interfaces (e.g., a WiFi interface, a BLUETOOTH® interface, and a wide-area wireless interface).

In some embodiments, the communication interface 702 may function to allow computing system 700 to communicate with other devices, remote servers, access networks, and/or transport networks. For example, the communication interface 702 may function to transmit and/or receive an indication of images of biological samples (e.g., sets of brightfield or other types of images that differ with respect to focal plane imaged within a sample) or some other information.

The user interface 704 of such a computing system 700 may function to allow computing system 700 to interact with a user, for example to receive input from and/or to provide output to the user. Thus, user interface 704 may include input components such as a keypad, keyboard, touch-sensitive or presence-sensitive panel, computer mouse, trackball, joystick, microphone, and so on. User interface 704 may also include one or more output components such as a display screen which, for example, may be combined with a presence-sensitive panel. The display screen may be based on CRT, LCD, and/or LED technologies, or other technologies now known or later developed. User interface 704 may also be configured to generate audible output(s), via a speaker, speaker jack, audio output port, audio output device, earphones, and/or other similar devices.

In some embodiments, user interface 704 may include a display that serves to present video or other images to a user (e.g., video of images generated during a particular scan of a particular biological sample). Additionally, user interface 704 may include one or more buttons, switches, knobs, and/or dials that facilitate the configuration and operation of the computing device. It may be possible that some or all of these buttons, switches, knobs, and/or dials are implemented as functions on a touch- or presence-sensitive panel. The user interface 704 may permit a user to specify the types of samples contained within an automated imaging system, to specify a schedule for imaging or other assessment of the samples, to specifying parameters of image segmentation, event analysis, and/or some other analysis to be performed by the system 700, or to input some other commands or parameters for operation of an automated laboratory system and/or for analysis of data generated thereby.

Processor 706 may comprise one or more general purpose processors—e.g., microprocessors—and/or one or more special purpose processors—e.g., digital signal processors (DSPs), graphics processing units (GPUs), floating point units (FPUs), network processors, tensor processing units (TPUs), or application-specific integrated circuits (ASICs). In some instances, special purpose processors may be capable of image processing, image alignment, statistical analysis, filtering, or noise reduction, among other applications or functions. Data storage 708 may include one or more volatile and/or non-volatile storage components, such as magnetic, optical, flash, or organic storage, and may be integrated in whole or in part with processor 706. Data storage 708 may include removable and/or non-removable components.

Processor 706 may be capable of executing program instructions 718 (e.g., compiled or non-compiled program logic and/or machine code) stored in data storage 708 to carry out the various functions described herein. Therefore, data storage 708 may include a non-transitory computer-readable medium, having stored thereon program instructions that, upon execution by computing device 700, cause computing device 700 to carry out any of the methods, processes, or functions disclosed in this specification and/or the accompanying drawings. The execution of program instructions 718 by processor 706 may result in processor 706 using data 712.

By way of example, program instructions 718 may include an operating system 722 (e.g., an operating system kernel, device driver(s), and/or other modules) and one or more application programs 720 (e.g., filtering functions, data processing functions, statistical analysis functions, image processing functions, depth determination functions, image segmentation functions) installed on computing device 700. Data 712 may include microscopy images or other data that includes sets of images of individual samples, depth information for samples, and/or segmentation information for samples.

Application programs 720 may communicate with operating system 722 through one or more application programming interfaces (APIs). These APIs may facilitate, for instance, application programs 720 receiving information via communication interface 702, receiving and/or displaying information on user interface 704, and so on.

Application programs 720 may take the form of "apps" that could be downloadable to computing device 700 through one or more online application stores or application markets (via, e.g., the communication interface 702). However, application programs can also be installed on computing device 700 in other ways, such as via a web browser or through a physical interface (e.g., a USB port) of the computing device 700.

In some examples, portions of the methods described herein could be performed by different devices, according to an application. For example, different devices of a system could have different amounts of computational resources (e.g., memory, processor cycles) and different information bandwidths for communication between the devices. For example, a first device could be an embedded processor(s) that could operate an actuated gantry, imaging apparatus, or other elements to generate information about biological samples at and/or during a plurality of different periods. A second device could then receive (e.g., via the internet, via a dedicated wired link), from the first device, information (e.g., image information, depth information) from the first device and perform the processing and analysis methods described herein on the received data. Different portions of the methods described herein could be apportioned according to such considerations.

VII. EXAMPLE METHODS

Figure 8:
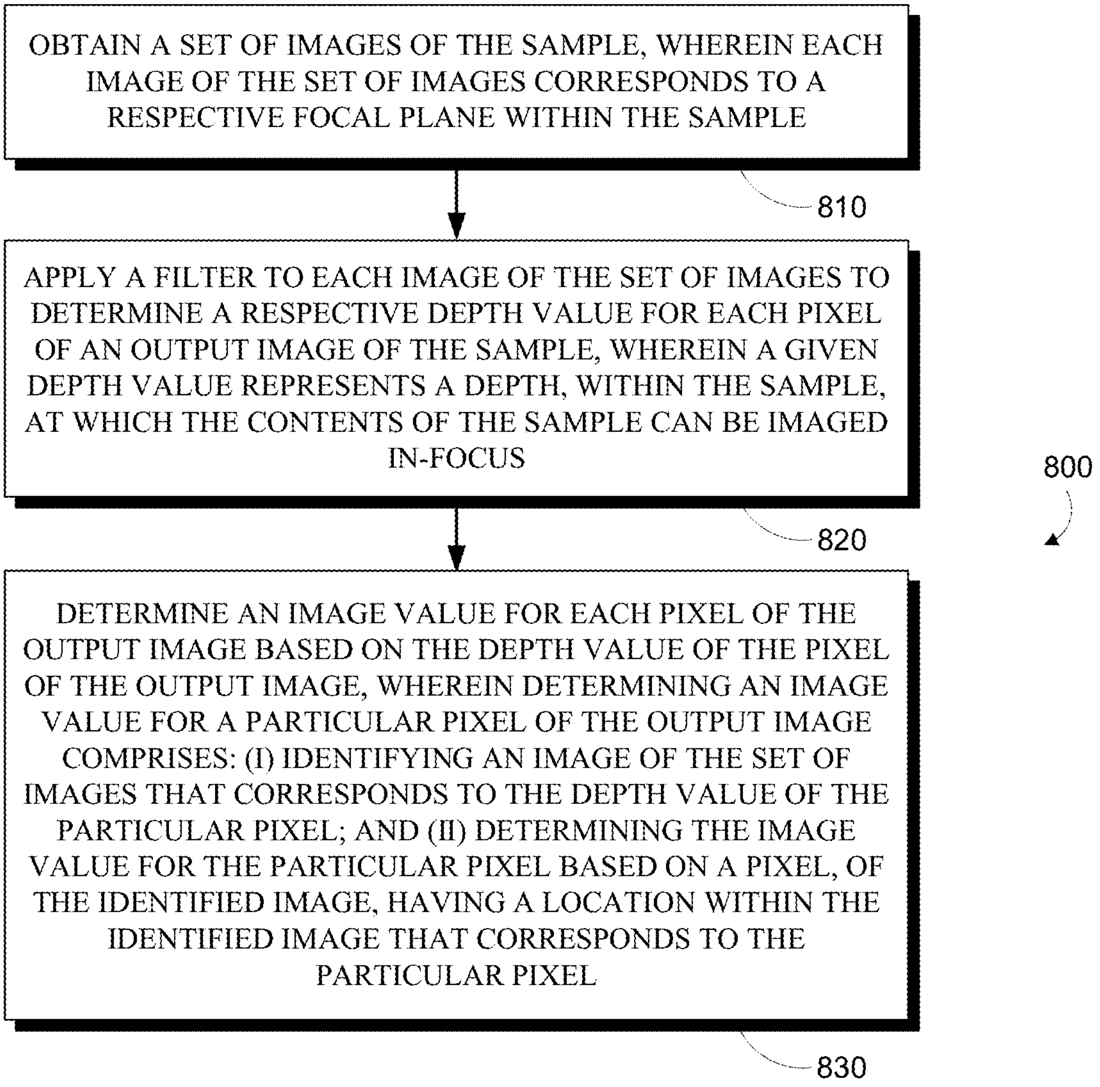
FIG. 8 is a flowchart of an example method.

FIG. 8 is a flowchart of a method 800 for generating a projection image of a three-dimensional sample. The method 800 includes obtaining a set of images of the sample, wherein each image of the set of images corresponds to a respective focal plane within the sample (810). The method 800 additionally includes applying a filter to each image of the set of images to determine a respective depth value for each pixel of an output image of the sample, wherein a given depth value represents a depth, within the sample, at which the contents of the sample can be imaged in-focus (820). The method 800 additionally includes determining an image value for each pixel of the output image based on the depth value of the pixel of the output image, wherein determining an image value for a particular pixel of the output image comprises: (i) identifying an image of the set of images that corresponds to the depth value of the particular pixel; and (ii) determining the image value for the particular pixel based on a pixel, of the identified image, having a location within the identified image that corresponds to the particular pixel (830). The method 800 could include additional elements or features.

Figure 9:
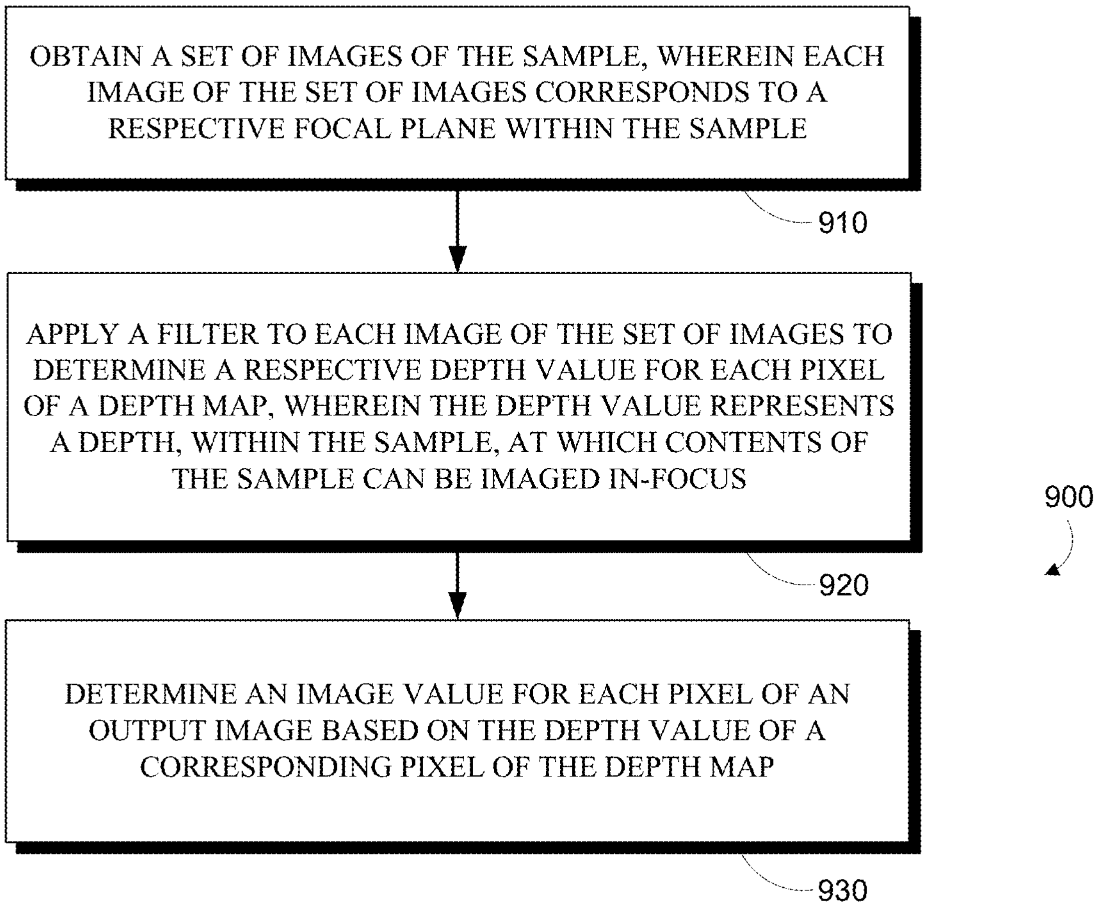
FIG. 9 is a flowchart of an example method.

FIG. 9 is a flowchart of a method 900 for generating a projection image of a three-dimensional sample. The method 900 includes obtaining a set of images of the sample, wherein each image of the set of images corresponds to a respective focal plane within the sample (910). The method 900 additionally includes applying a filter to each image of the set of images to determine a respective depth value for each pixel of a depth map, wherein a given depth value represents a depth, within the sample, at which the contents of the sample can be imaged in-focus (920). The method 900 further includes determining an image value for each pixel of an output image based on the depth value of a corresponding pixel of the depth map (930). The method 900 could include additional elements or features.

Figure 10:
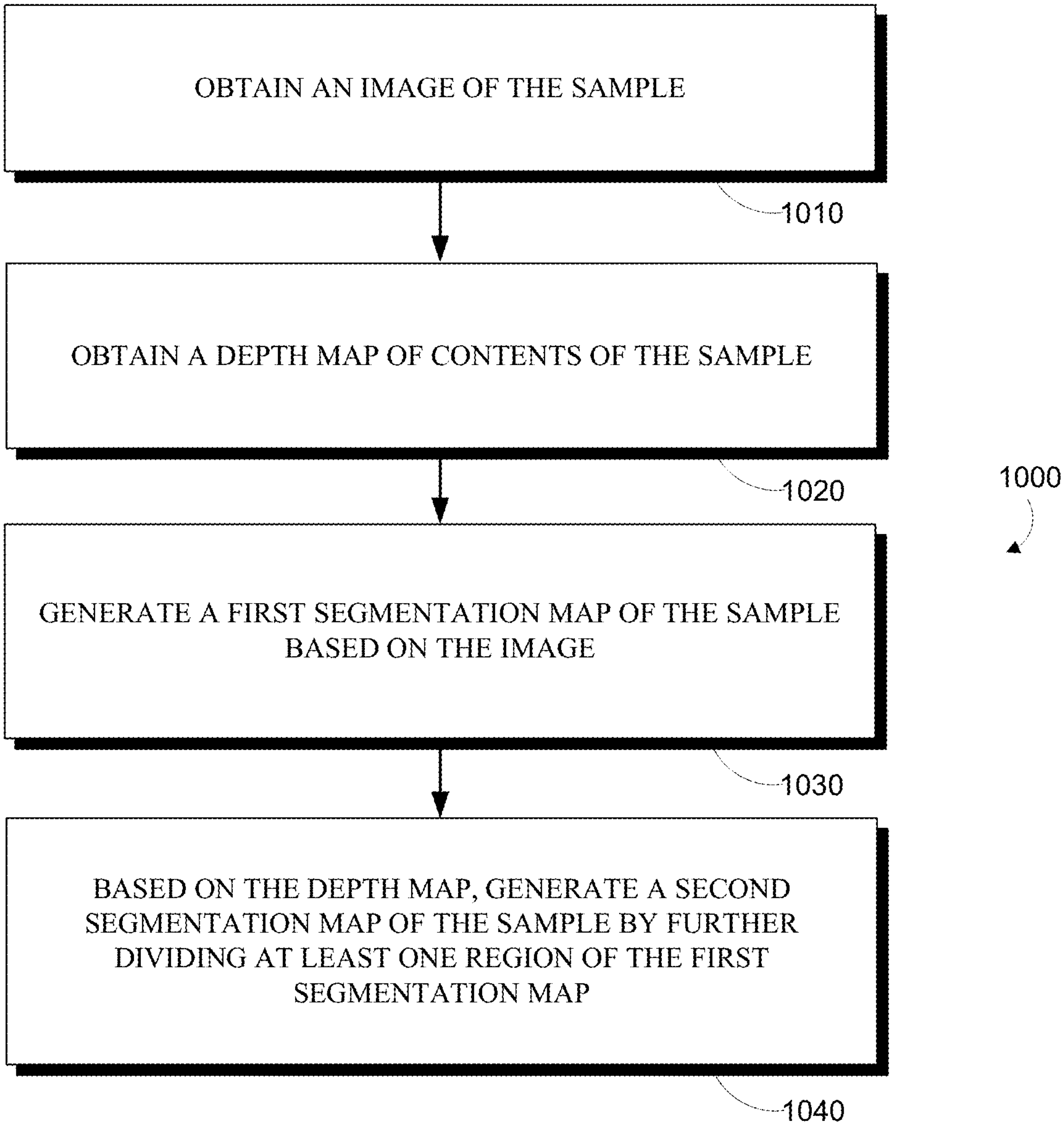
FIG. 10 is a flowchart of an example method.

FIG. 10 is a flowchart of a method 1000 for segmenting an image of a sample. The method 1000 includes obtaining an image of the sample (1010). The method 1000 additionally includes obtaining a depth map of contents of the sample (1020). The method 1000 further includes generating a first segmentation map of the sample based on the image (1030). The method 1000 further includes, based on the depth map, generating a second segmentation map of the sample by further dividing at least one region of the first segmentation map (1040). The method 1000 could include additional elements or features.

VIII. CONCLUSION

The above detailed description describes various features and functions of the disclosed systems, devices, and methods with reference to the accompanying figures. In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flowcharts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

We claim:

1. A method for generating a projection image of a three-dimensional sample, the method comprising:

obtaining a set of images of the sample, wherein each image of the set of images corresponds to a respective focal plane within the sample;

applying a filter to each image of the set of images to determine a respective depth value for each pixel of an output image of the sample, wherein a given depth value represents a depth, within the sample, at which the contents of the sample can be imaged in-focus;

applying the filter to a particular pixel of a particular image of the set of images for determining a measure of variability of pixels of the particular image that are in a neighborhood of the particular pixel, wherein the pixels in the neighborhood are used in a weighted manner to determine the measure of variability by giving higher weighting to pixels closer to the particular pixel than to farther away pixels;

determining an image value for each pixel of the output image based on the depth value of the pixel of the output image, wherein determining an image value for a particular pixel of the output image comprises: (i) identifying an image of the set of images that corresponds to the depth value of the particular pixel; and (ii) determining the image value for the particular pixel based on a pixel, of the identified image, having a location within the identified image that corresponds to the particular pixel;

generating a first segmentation map of the sample based on the output image, the first segmentation map comprising a plurality of distinct regions identified in the output image;

selecting, from the depth values of the pixels of the output image, a set of depth values that correspond to a particular region of the plurality of distinct regions;

identifying at least two clusters within the selected set of depth values; and generating a second segmentation map of the sample based at least in part on the identified at least two clusters by further dividing the particular region into at least two regions corresponding to the identified at least two clusters.

2. The method of claim 1, wherein the filter is a texture filter, and wherein the measure of variability comprises at least one of a standard deviation, an entropy, or a numerical range of pixels of the particular image that are in a neighborhood of the particular pixel.

3. The method of claim 1, further comprising generating a depth map for the sample based on the depth values.

4. The method of claim 1, further comprising:

spatially pre-processing the determined depth values, wherein determining the image value for each pixel of the output image based on the depth value of the pixel of the output image comprises determining the image value for each pixel of the output image based on the spatially pre-processed depth value of the pixel of the output image.

5. The method of claim 1, wherein the set of images is a set of brightfield images of the sample.

6. The method of claim 1, wherein the set of images is a set of fluorescent images of the sample.

7. The method of claim 1, wherein the sample contains at least one three-dimensional cultured multicellular structure.

8. The method of claim 7, wherein the at least one three-dimensional cultured multicellular structure includes at least one of an organoid embedded in extracellular matrix or a tumor spheroid.

9. The method of claim 8, wherein the at least one three-dimensional cultured multicellular structure includes an organoid embedded in extracellular matrix, wherein the extracellular matrix has the form of a dome of extracellular matrix.

10. The method of claim 8, wherein the at least one three-dimensional cultured multicellular structure includes at least one of a hepatic-cell organoid, a pancreatic-cell organoid, or an intestinal-cell organoid.

11. The method claim 1, wherein determining the image value for the particular pixel of the output image additionally comprises: (iii) identifying two or more additional images of the set of images that correspond to depth values within a neighborhood of the depth value of the particular pixel, and wherein determining the image value for the particular pixel based on the pixel, of the identified image, having a location within the identified image that corresponds to the particular pixel comprises performing a pixel-wise operation on pixels of the identified image and the two or more additional images that have locations within their respective identified images that correspond to the particular pixel.

12. The method of claim 1, wherein the neighborhood comprises a square region of neighboring pixels centered on the particular pixel, and wherein determining the measure of variability comprises calculating a measure of variability for every pixel in the square region.

13. The method of claim 1, further comprising:

determining whether the depth value of the particular pixel is an outlier relative to depth values of neighboring pixels; and amending the depth value of the particular pixel based on a determination that the value of the particular pixel is an outlier.

14. The method of claim 13, wherein determining whether the depth value of the particular pixel is an outlier includes determining that the depth value of the particular pixel varies from a mean depth value of the neighboring pixels by a threshold amount.

15. The method of claim 13, wherein amending the depth value of the particular pixel includes setting the depth value of the particular pixel to a particular value, the particular value at least partially based on depth value of the neighboring pixels.

16. The method of claim 15, wherein the particular value comprises one of a mean of the depth values of the neighboring pixels and a median of the depth values of the neighboring pixels.

17. The method of claim 13, wherein amending the depth value of the particular pixel includes modifying one or more parameters of the filter and applying the modified filter to the particular image, and determining an updated depth value for the particular pixel based on the modified filter.

18. The method of claim 1, wherein generating the first segmentation map includes visually distinguishing each of the plurality of distinct regions from adjacent distinct regions.

19. The method of claim 1, wherein identifying the at least two clusters includes one of a clustering or region growing operation on the set of depth values that correspond to the particular region.

20. A non-transitory computer readable medium having stored thereon instructions executable by at least one processor to perform the operations of claim 1.

* * * * *